Nov. 9, 1965   M. J. NORTHCUTT   3,216,308
AIRCRAFT LANDING SIGHT INCLUDING COLLIMATING
MANGIN MIRROR CORRECTOR LENS
Filed Oct. 5, 1961

INVENTOR.
Marvin J. Northcutt,
BY
H. H. Leach
Paul S. Collignon
Attorneys.

# United States Patent Office 3,216,308
Patented Nov. 9, 1965

3,216,308
AIRCRAFT LANDING SIGHT INCLUDING COLLIMATING MANGIN MIRROR AND CORRECTOR LENS
Marvin J. Northcutt, Indianapolis, Ind., assignor to the United States of America as represented by the Secretary of the Navy
Filed Oct. 5, 1961, Ser. No. 143,256
1 Claim. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft landing aid, and more particularly to an aircraft landing sight which is to be used in conjunction with an optical landing device that defines a desired glide path. The present invention, along with the optical landing device, greatly facilitates the landing of aircraft, particularly when the landing area is comparatively short, as that of the landing deck on an aircraft carrier.

In U.S. Patent 2,784,925, which issued March 12, 1957 to Hilary Goodhart, there is described an optical landing aid which provides a prescribed glide path by orienting a reflected image of a light source with an interrupted row of directly viewed lights. A curved mirror is positioned centrally between a row of directly viewed stationary lights (mirror datum lights) and tilted at a predetermined angle to an aircraft landing area to reflect an image of a remotely positioned light source. A pilot, when coming in for a landing sees a row of light sources (mirror datum lights) extending horizontally outward from each side of the mirror; and the image of a light source reflected by the mirror. The alignment of the image of the remote light source, as viewed through the curved mirror, with the directly viewed row of light sources defines the desired glide path angle in elevation, from the mirror, for the pilot to maintain. With this device, a relatively small deviation in altitude of the aircraft from the defined descent path is indicated by an appreciable vertical displacement of the image of the reflected light source relative to the directly viewed row of light sources.

While the optical landing devices that are mounted either on the ground, or on carriers, provide the desired glide path, this information alone is not sufficient to provide a safe landing of an aircraft for it is possible to stay on a glide path at many different speeds. If the speed of the aircraft is too low a stall condition may result and if the landing speed of an aircraft is too high, damage to the aircraft may result upon landing.

The present invention provides a fixed reference line that gives a visual indication of pitch and bank attitude to an aircraft pilot on a mirror landing approach, and in addition, when the fixed reference line is superimposed over the viewed mirror datum lights, the desired angle of attack is being maintained on the glide path. As angle of attack is related to the velocity of the aircraft, when the fixed reference line is superimposed over the viewed mirror datum lights, the proper landing speed is being maintained.

As the landing sight must be mounted between the pilot and the windshield, it is of extreme importance that the size of the landing sight be kept as small as possible so as to minimize the reduction of the pilot's view. The present invention comprises a small, compact sight unit that produces a single reference line focussed at infinity by incorporating a solid lens system employing a folded light path which passes through a beam splitter and unique Mangin mirror correction system to properly collimate the projected image.

It is therefore a general object of the present invention to provide an improved landing sight for use in aircraft.

Another object of the present invention is to provide an improved sight which when used in conjunction with a mirror landing system provides angle of attack information.

Still another object of the present invention is to provide a small, compact, sight unit that will provide a fixed reference line for aiding in the landing of an aircraft.

Other objects and advantages of the present invention will be readily appreciated as the same becomes better understood by reference to the following detailed description when considered in connection with the accompanying drawing wherein.

Figure 1:
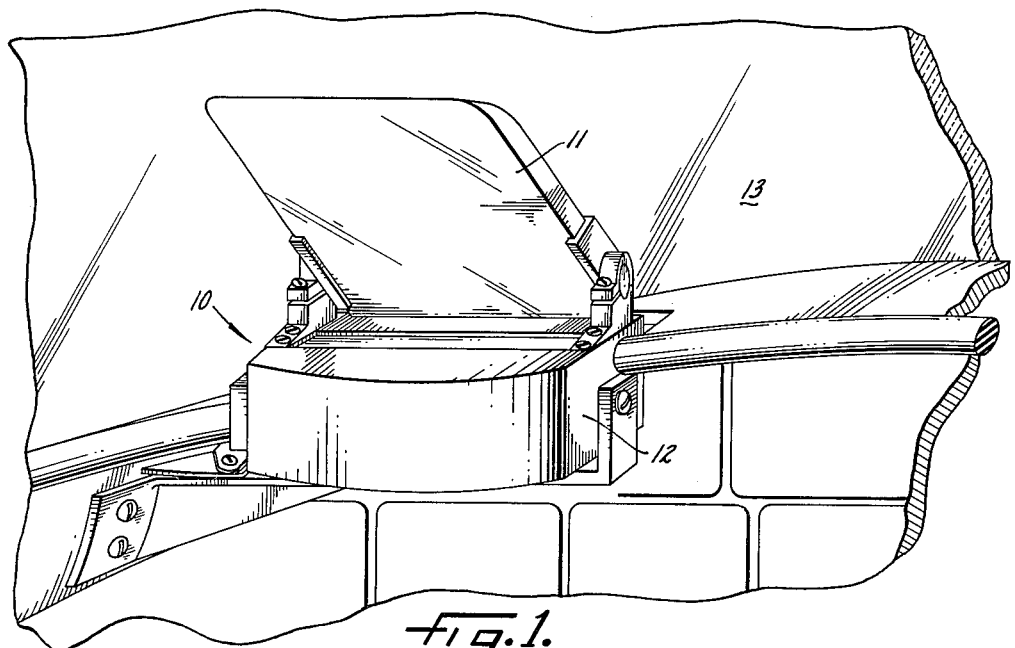
FIGURE 1 is a perspective view showing a landing sight mounted in an aircraft.

Referring now to the drawing, there is shown in FIGURE 1, a landing sight unit 10 that is mounted in the cockpit of an aircraft. The reflector plate 11 of the sight unit 10 is mounted to casing 12 and is adjacent the windshield 13 of the aircraft so that the pilot can look through the reflector plate and the windshield. As the mirror landing aid on an aircraft carrier is normally mounted on the starboard side, the landing sight unit would preferably be mounted on the port side of the aircraft.

Figure 4:
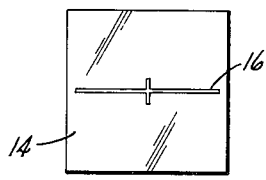
FIGURE 4 is a view showing a reticle.
Figure 3:
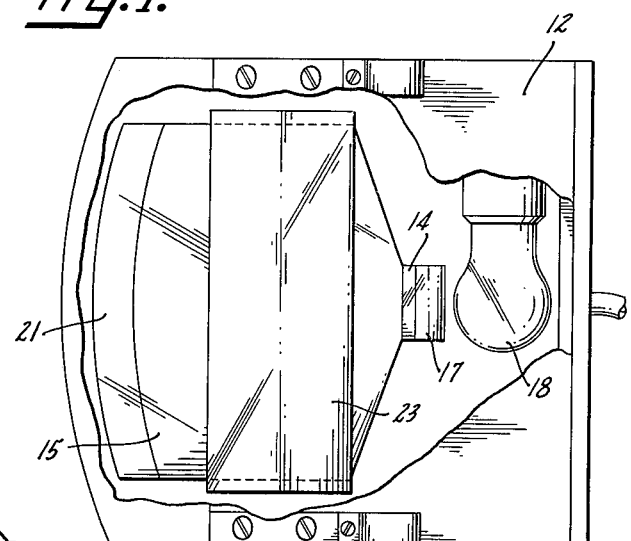
FIGURE 3 is a top view partly broken away to show the optical elements of the present invention.
Figure 2:
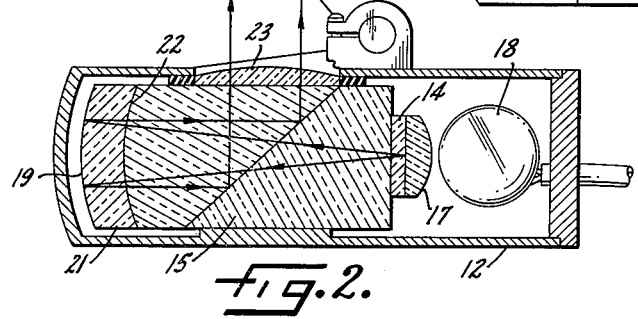
FIGURE 2 is a partial sectional view showing the lens system of the present invention.

As shown in FIGURES 2, 3, and 4 of the drawing, a reticle 14 is provided and is attached, as by cementing, to a prism block beam splitter 15. By way of example, reticle 14 might be made of a glass plate and be made opaque, except for the pattern 16, by depositing a metal coating, such as aluminum thereon. As a thin reference line is to be provided, pattern 16 merely needs to be a straight slit, but for convenience, a small vertical line is provided to designate the middle of the slit. A condensing lens 17 is attached, as by cementing, to reticle 14, and by way of example, is made of red glass so as to color the light that is being emitted from light source 18. In addition to coloring the light, condensing lens 17 concentrates the rays of light that are passed through the pattern 16 of reticle 14.

After the rays of light emitting from light source 18 pass through reticle 14, they enter and pass through beam splitter 15 and then are reflected back by the reflecting surface 19 of a Mangin mirror 21. The rays of light are then reflected upward by beam splitter 15 and are then reflected by reflector plate 11 into the eyes of an aircraft pilot.

As it is desirable to have a two-eye system, that is, have the pilot view the reflected reticle pattern with both eyes, a wide exit aperture, such as about three inches, is provided. In order to minimize spherical aberration, a wide exit aperture requires a relatively long focal length and normally a three inch wide exit aperture would require a focal length of about eight or nine inches. However, as it is important that the size of the sight unit be kept small, Mangin mirror 21 is provided which permits a relatively short focal length of about two and one-half inches.

Mangin mirror 21 is provided with a metalized reflecting surface 19 which acts as a spherical mirror and surface 22 corrects for the spherical aberration of the reflecting surface. The radius of the correcting surface 22, which is spherical, is chosen so that the marginal rays are brought closely to the same focus as the paraxial rays. In order to complete the collimation of the rays, an exit corrector 23, which is a positive spherical corrector, is provided on the top, exit portion, of the beam splitter 15.

By way of example, the radius of the spherical mirror surface 19 might be −126.70 mm.; the radius of the spherical correcting surface 22 might be −49.32 mm.; the radius of spherical exit corrector might be 204.73 mm.; the index of refraction of the Mangin mirror 21 might be 1.649; and the index of refraction of the beam splitter 15 and the exit corrector 23 might be 1.517.

In operation, assuming a carrier landing, the pilot energizes light source 18 which provides a thin red reference line on reflector plate 11. The pilot makes a normal entry onto the glide path using normal flight instruments. After stabilizing on the glide path and making a normal first half of an approach, the sight unit reference line should have come to rest in the vicinity of the mirror. The pilot then makes correction to bring the reference line in alignment with the mirror datum lights on the aircraft carrier. If the reference line is seen above the mirror datum lights, the aircraft is traveling too slow, and the pilot should add throttle and, as airspeed increases, the reference line will lower with respect to the mirror datum lights. If the reference line is seen below the mirror datum lights, the aircraft is traveling too fast, and the pilot should reduce throttle and, as airspeed decreases, the reference line will raise with respect to the mirror datum lights.

It can thus be seen that the present invention provides an improved sight unit that will provide a reference line that can be used in aiding an aircraft in landing on a small area. Furthermore, the sight unit is small and compact and only slightly reduces the area of visibility of an aircraft pilot.

Obviously many modifications and variations of the present invention are possible in the light of the above teachings. It is therefore to be understood, that within the scope of the appended claim, the invention may be practiced otherwise than as specifically described.

What is claimed is:

An optical sight unit for aiding the landing of an aircraft comprising:

a prism block beam splitter having a flat surface on one end, a spherical surface on an opposite end, an internal plane face having a semi-reflecting surface angularly disposed between said flat surface and said spherical surface, and an exit aperture above said angularly disposed plane face;

a reticle plate attached to said flat surface of said beam splitter for forming an optical image, a negative meniscus lens having first and second spherical surfaces, said first spherical surface being contoured to fit and being cemented to said spherical surface on said beam splitter and said second spherical surface being a mirrored surface, said spherical surface on said beam splitter and said first spherical surface on said negative meniscus lens being contoured to correct for spherical aberration of said mirrored surface, a positive correcting lens having a spherical surface and a flat surface, said flat surface being cemented to said beam splitter at said exit aperture, and a reflector plate angularly disposed above said positive correcting lens whereby said optical image reflecting from said mirrored surface and said semi-reflecting surface of said plane face and passing through said exit aperture and said spherical correcting lens is reflected by said reflector plate into the eyes of an aircraft pilot.

References Cited by the Examiner

UNITED STATES PATENTS

| | | | |
|---|---|---|---|
| 2,352,644 | 7/44 | Lindeman et al. | 88—2.3 |
| 2,358,316 | 9/44 | Chwalow | 88—1 |
| 2,441,160 | 5/48 | Martin | 88—2.6 |
| 2,490,747 | 12/49 | Creighton | 88—1 X |
| 2,895,372 | 7/59 | Tacklind et al. | 88—2.4 |

FOREIGN PATENTS 880,946  6/53  Germany.

DAVID H. RUBIN, *Primary Examiner.*